(12) United States Patent
Kureth

(10) Patent No.: US 11,051,064 B1
(45) Date of Patent: Jun. 29, 2021

(54) SYSTEM AND PROCESS OF ADAPTIVE VIDEO STREAMING SERVICE WITH ANTI-PIRACY TRACKING PROVIDING A UNIQUE VERSION OF A MOVIE CUSTOMIZED BY ARTIFICIAL INTELLIGENCE AND TAILORED SPECIFICALLY FOR EACH PERSON OR GROUP OF PEOPLE WATCHING

(71) Applicant: Michael Kureth, Burbank, CA (US)

(72) Inventor: Michael Kureth, Burbank, CA (US)

( * ) Notice: Subject to any disclaimer, the term of this patent is extended or adjusted under 35 U.S.C. 154(b) by 0 days.

(21) Appl. No.: 16/597,700

(22) Filed: Oct. 9, 2019

Related U.S. Application Data

(60) Provisional application No. 62/785,285, filed on Dec. 27, 2018.

(51) Int. Cl.
*H04N 21/475* (2011.01)
*H04N 21/234* (2011.01)
*H04N 21/45* (2011.01)
*H04N 21/2668* (2011.01)
*H04N 21/258* (2011.01)
*G06F 16/9536* (2019.01)
*G06F 16/9535* (2019.01)
*H04N 21/458* (2011.01)

(52) U.S. Cl.
CPC ..... *H04N 21/2668* (2013.01); *G06F 16/9535* (2019.01); *G06F 16/9536* (2019.01); *H04N 21/23424* (2013.01); *H04N 21/25891* (2013.01); *H04N 21/458* (2013.01); *H04N 21/4532* (2013.01); *H04N 21/4755* (2013.01)

(58) Field of Classification Search
CPC ......... H04N 21/2668; H04N 21/25891; H04N 21/4755; H04N 21/4532; H04N 21/458; H04N 21/23424; G06F 16/9536; G06F 16/9535
See application file for complete search history.

(56) References Cited

U.S. PATENT DOCUMENTS

| | | | |
|---|---|---|---|
| 9,088,823 B1 * | 7/2015 | Price | H04N 21/812 |
| 2002/0092019 A1 * | 7/2002 | Marcus | H04N 21/2668 725/37 |
| 2003/0046638 A1 * | 3/2003 | Thompson | G11B 27/105 709/231 |
| 2003/0081834 A1 * | 5/2003 | Philomin | H04N 21/44218 382/190 |
| 2008/0168489 A1 * | 7/2008 | Schraga | H04N 21/2668 725/32 |
| 2012/0084805 A1 * | 4/2012 | Barnes, Jr. | H04W 4/18 725/28 |
| 2013/0283162 A1 * | 10/2013 | Aronsson | H04N 21/42201 715/719 |

(Continued)

*Primary Examiner* — Robert J Hance
(74) *Attorney, Agent, or Firm* — Plager Schack LLP; Mark H. Plager; Alexis J. Saenz

(57) ABSTRACT

A system and process generate tailored movies based on user profile data. The system extracts a viewer's profile data and selects scenes for assembly into a rendered movie. Different viewers may thus see different movie storylines based on their individual profile data. Some embodiments may include an anti-piracy scheme which may watermark parts of the individualized movies. A blockchain may be used to determine whether a movie is generated for the user viewer or an unauthorized copy of someone's else's movie.

5 Claims, 7 Drawing Sheets

(56) References Cited

U.S. PATENT DOCUMENTS

| | | | | |
|---|---|---|---|---|
| 2014/0325550 | A1* | 10/2014 | Winograd | H04N 21/8456 725/19 |
| 2015/0358661 | A1* | 12/2015 | Navarro | H04N 21/2668 725/59 |
| 2016/0064038 | A1* | 3/2016 | Ceracchini | G11B 27/105 386/241 |

* cited by examiner

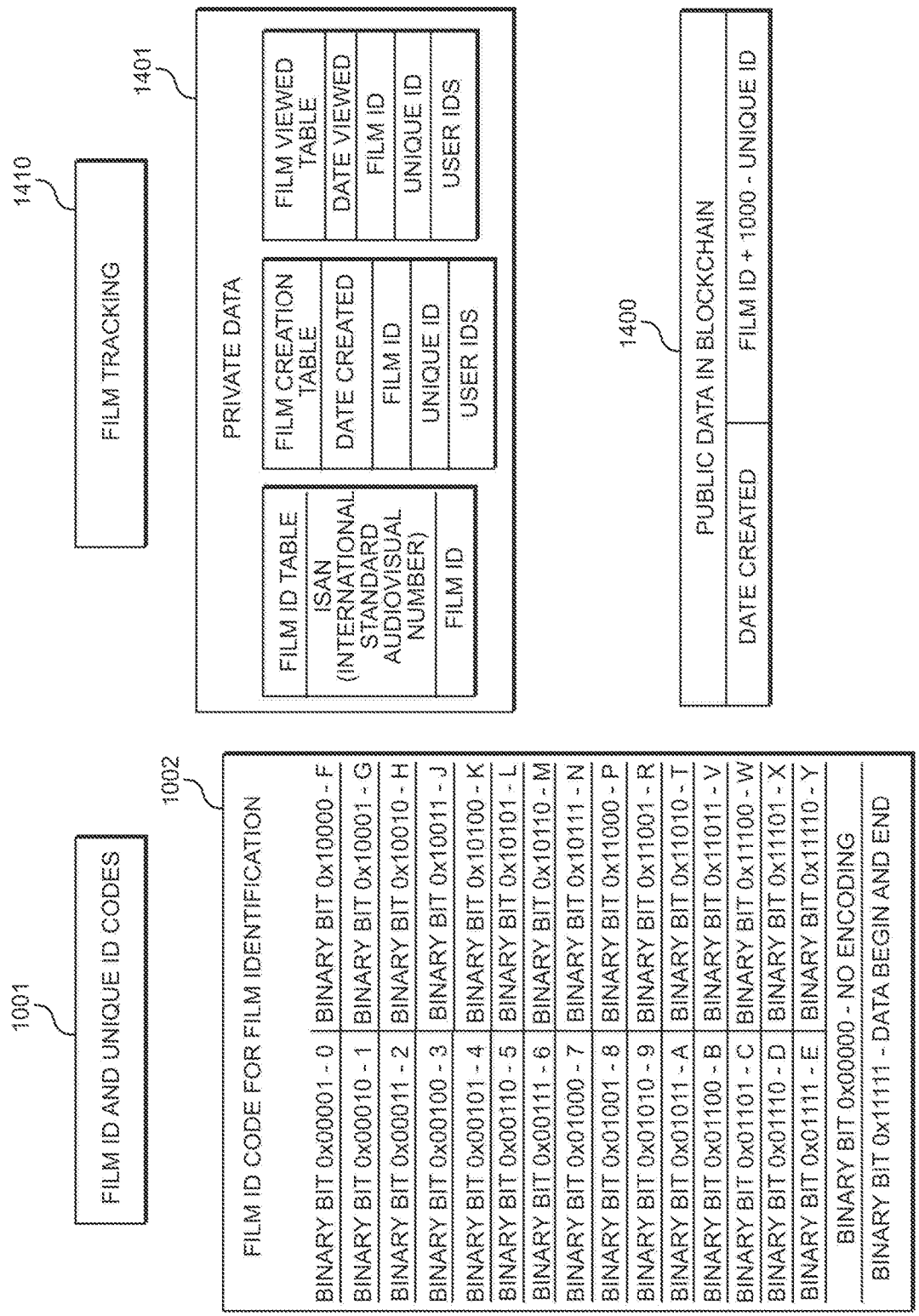

SYSTEM AND PROCESS OF ADAPTIVE VIDEO STREAMING SERVICE WITH ANTI-PIRACY TRACKING PROVIDING A UNIQUE VERSION OF A MOVIE CUSTOMIZED BY ARTIFICIAL INTELLIGENCE AND TAILORED SPECIFICALLY FOR EACH PERSON OR GROUP OF PEOPLE WATCHING

CROSS-REFERENCE TO RELATED APPLICATIONS

This application claims benefit under 35 U.S.C. § 119(e) of U.S. Provisional Application having Ser. No. 62/785,285 filed Dec. 27, 2018, which is hereby incorporated by reference herein in its entirety.

BACKGROUND

The embodiments herein relate generally to entertainment technology, and more particularly, to a system and process of adaptive film streaming.

As a filmmaker, how does it feel to see your film leak on torrent sites weeks before its official release? The film industry is suffering two critical issues: 1) fans have become bored with unoriginal and predictable content and 2) filmmakers and studios are losing profit due to piracy. The current film making process is linear without the viewer in mind. Additionally, films are easily pirated and distributed for free losing revenue for the filmmakers.

As can be seen, there is a need to improve upon the current approaches to providing films to thwart piracy and provide a unique viewing experience.

SUMMARY

According to one embodiment of the subject disclosure, a process for generating customized movies tailored to a viewer user comprises receiving an input of a user profile from the viewer user; extracting user related attributes from the user profile; assembling a customized digital sequence of movie scenes based on the user profile; and rendering the customized digital sequence of movie scenes into a dynamic streaming movie tailored to the user based on the user related attributes.

According to another embodiment, a computer program product for generating customized movies tailored to a viewer user id disclosed. The computer program product comprises a non-transitory computer readable storage medium having computer readable program code embodied therewith. The computer readable program code is configured, when executed by a processing unit, to: receive an input of a user profile from the viewer user; extract user related attributes from the user profile; assemble a customized digital sequence of movie scenes based on the user profile; and render the customized digital sequence of movie scenes into a dynamic streaming movie tailored to the user based on the user related attributes.

BRIEF DESCRIPTION OF THE FIGURES

The detailed description of some embodiments of the present invention is made below with reference to the accompanying figures, wherein like numerals represent corresponding parts of the figures.

FIG. 7 is a diagrammatic view of a data encoding scheme using the antipiracy scheme of FIG. 6 according to an exemplary embodiment.

FIG. 8 is a tabular view of data blocks used in tracking piracy of film files through a blockchain network according to an exemplary embodiment.

DETAILED DESCRIPTION OF CERTAIN EMBODIMENTS

The word "exemplary" is used herein to mean "serving as an example or illustration." Any aspect or design described herein as "exemplary" is not necessarily to be construed as preferred or advantageous over other aspects or designs.

By way of example, and referring to the Figures, embodiments generally disclose a system and process for generating unique film viewing experiences for individuals. Embodiments tailor films to the viewer user by using viewer data to customize scenes in the films based on attributes associated with the viewer. As may be appreciated, this makes one movie into potentially several different permutations of stories depending on the viewer. Moreover, two (or more) viewers watching the same film may experience one story based on one viewer's profile and yet may experience a different movie watching it again according to the other user's profile. As a result, a dynamic movie experience is generated based on viewer profile data creating an entirely new movie watching experience.

In another aspect, some embodiments provide anti-piracy protection measures which may for example, watermark sections of the streaming data to track a film file's location and user history.

As will be used below, the terms "movie" and "film" may be used interchangeably and may refer to a moving video of a digital stream of data.

Referring now to the Figures specifically, FIGS. 1-5 disclose the tailored film generation process. FIGS. 6-8 disclose antipiracy techniques.

Figure 1:
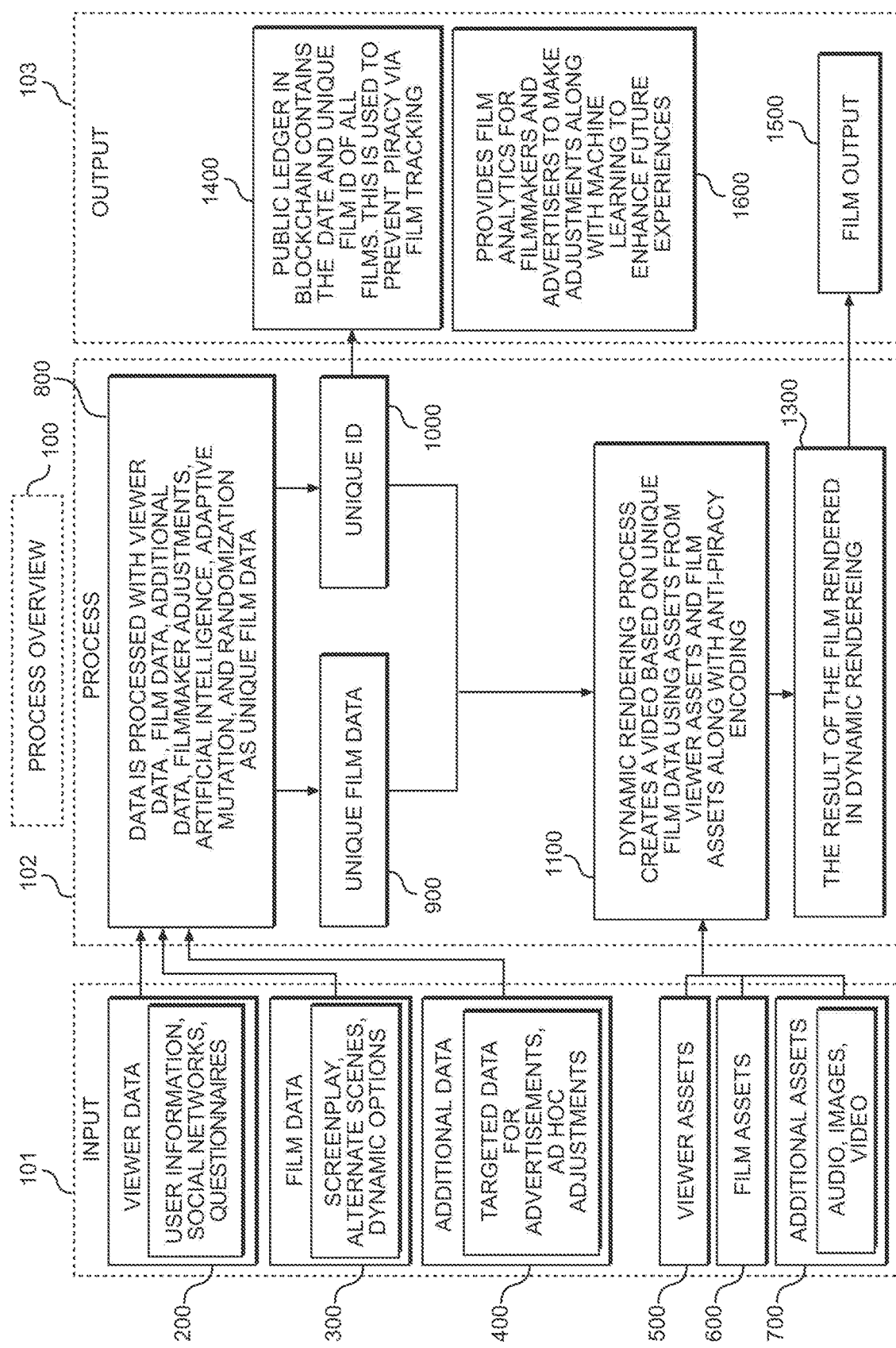
FIG. 1 is a flowchart of a process for generating unique films tailored to the viewer according to an exemplary embodiment.

Referring now to FIGS. 1-5, unique film generation embodiments are disclosed according to exemplary embodiments. FIG. 1 shows a process overview 100 broken up into three main subprocesses; input 101, processing 102, and output 103. In general, a film may be prepared into a video stream of scenes whose sequence or content may be modified. In some embodiments, the sequence of scenes may be modified on the fly from a default streaming sequence of scene content being streamed and modified in real-time as a viewer watches the movie. In some embodiments, the video stream of default scene sequences is in a pre-set order but modified depending on the viewer's profile (or other dynamic factors) before being streamed. In an exemplary embodiment, a file of the video stream may have at certain scene points, a plurality of scenes available as options to be shown for the scene point, one of which may be inserted into the stream as determined based on a user's profile data. For sake of illustration, the figures will show these "decision" points at pre-selected scene points, however it will be understood that other embodiments may have multiple variations for each scene point as may be practically possible for a movie.

The input process 101 generally receives and stores user data which is used to decide which scenes may be used for the movie. In an exemplary embodiment, the viewer data 200 may be used to determine what content from blocks 300, 400, 500, 600, and 700 may be displayed within the film watching experience.

Figure 2:
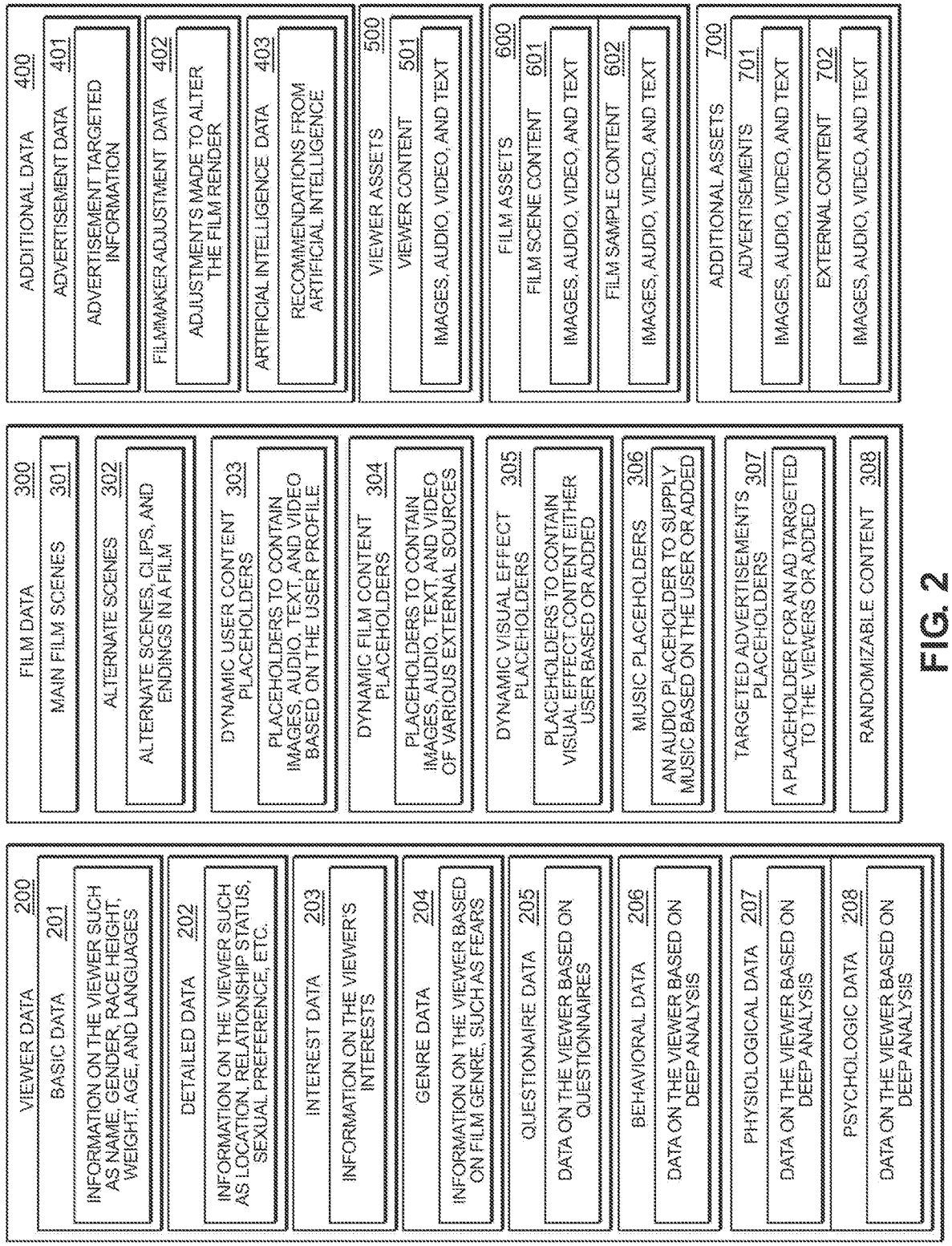
FIG. 2 is a tabular view of data sources used in the process of FIG. 1 according to an embodiment.

Referring temporarily to FIG. 2 in conjunction with FIG. 1, details of the blocks 200, 300, 400, 500, 600, and 700 are shown according to an exemplary embodiment.

Viewer data 200 represents a user's attributes extracted from the profile about the user which may be a source of information from which the process can use to tailor the insertion of scene variations. The user's profile may include data related to the user's preferences, personality, biographical information, social media activity, and answers to questionnaires. In some embodiments, the user's profile may be built up by data mining their online activity. The viewer data may include basic data 201 which may include biographical information. Block 202 may include detailed information about the user's life including for example the user's location (city, state, and country), relationship status, sexual preferences, etc. Block 203 may include data on the viewer's interests. Block 204 may include data on the user's preferred movie genres. Block 205 may include data of stored responses to view questionnaires. Blocks 206, 207, and 208 may include data about the user related to behavior and psychology. The data in blocks 206, 207, and 208 may be generated from machine learned deep analysis of the user's profile and activity.

Block 300 represents film data which may include for example, the original or default screenplay, alternate scenes, and dynamic options. Dynamic options represent everything in the film that has the option to be swapped with dynamic content. The film data 300 may include main film scenes 301 which may represent a movie with a default sequence of scenes. A default sequence of scenes may be shown for example, if a user's profile were not used to determine modifications to the movie or for example, if the user's profile did not show a need to modify the default sequence of scenes. The film data 300 may also include alternate scenes 302 that may be inserted into the default sequence of scenes based on the user's profile. Block 303 represents dynamic user content placeholders which may include images, audio, text, and video based on the user profile. These are specific to the viewer such as friends on missing posters, family on police station wall as victims, rendering scenes with recognizable names, locations, and more along with familiar images, audio, and video. Auditory examples include recognizable names and relatable phrases spoken off camera or synthesized through computer processing. These are to trigger an emotional connection to the film. Block 304 represents dynamic film content placeholders which may include images, audio, text, and video of various external sources. Examples of these would be a current event news broadcast, text description based on the viewer's location, and recognizable images, audio, and video which connects the viewer to the story. External audio examples include pitches, frequencies, and sounds specific to the viewer to entice an emotion (e.g., nails on chalk board, water drip, low bass, etc.). Block 305 may include dynamic visual effect placeholders which may include user based or added visual effect content. Examples include: the viewer's name or recognizable phrase animating in blood, on a wall, on paper, on mirror, in smoke or sand, etc. Further extension supports deep fake content to resemble a person recognized by the viewer. Block 306 may include music placeholders which may include user based or added music content. Music content is selected by user preference, current trends, and emotional connection of the viewer. Music can be selected for a user or group of users based on common interest or to stimulate an emotional response. Block 307 may include targeted advertisement placeholders which may include user based or added advertisement content targeted at the user. Examples of this include a radio playing in a scene, a billboard on a road, a television in a scene. Each advertisement may be specific for the viewer. Block 308 may include randomizable content. Examples of this content makes the film unpredictable even on subsequent viewing, such as: a random set of unpredictable timing for scare sequences and alternate scare based on previously seen in the movie or other movies.

Block 400 may include additional data which may include for example, targeted data 401 for advertisements. Some embodiments may include data for ad hoc adjustments. Block 402 may include filmmaker adjustment data which may include adjustments made to alter the rendered movie. This process controls all aspects of the customized movie. For example, if a particular scene or content is performing well, it can be adjusted to appear more frequently for viewers. Additionally, even simple adjustments such as replacing a controversial clip is easy. Block 403 may include artificial intelligence (A.I.) data which may include recommendations generated by an A.I. engine. A.I. causes a film generation engine to learn from and adapt to users for unpredictability and optimization based on previous user experience and learning the user's fears, comedic style, and more. This also makes the movie more re-watchable since the A.I. alters from past versions by learning and adapting to engage the viewer further.

Block 500 may include data related to the viewer's digital assets which may be images, audio, and video of the user, friends, and more. These assets may be acquired when the viewer connects to a social media account for example. A backend of the system may mine and collect these assets during the user's online activity.

Block 600 may include data related to film assets which may include film scene content 601 and film sample content 602. Examples of film scene content targeted for the viewer includes: a death scene based on a user phobia of spiders, snakes, dismemberment, maggots, eyes gouged, etc. Further examples may be based on a user's animal preference include a traumatic flashback scene where a pet which looks similar to the viewer's as a child is murdered. The user's preference of animal can be shown (cat, dog, etc.) Similar content may be altered for comedic impact. All content is supplied as images, video, and audio as part of the film.

Block 700 may include data related to additional assets which may include advertisement data 701 and external content 702. Advertisement assets are images, video, and audio targeted for the viewer. External content is generic images, video, and audio specific for the viewer selected from third party. Examples of this includes recognizable landmarks and current events relatable to the viewer in the form of audio and video.

Figure 3:
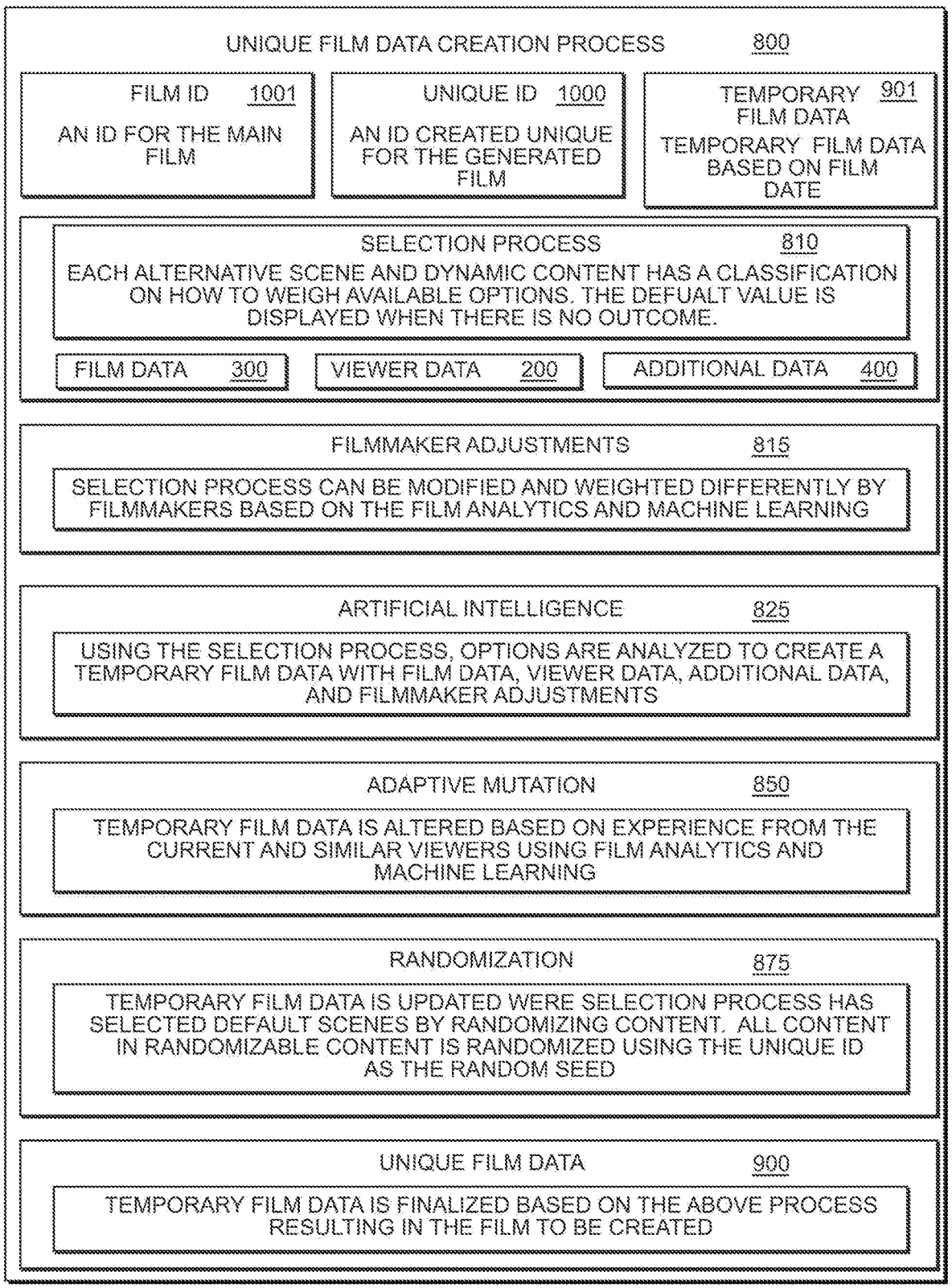
FIG. 3 is a diagrammatic view of a film creation process according to an exemplary embodiment.

Referring now to FIG. 1 along with FIG. 3, an exemplary embodiment is the processing segment 102 is shown. The processing segment 102 uses the information from input segment 101 in the unique film creation process 800. In general, the processing segment 102 may include performing the unique film creation process 800 which may generate a customized sequence of scenes using the user's data. Unique film data 900 may be integrated into the customized output data from the process 800. Some embodiments may attach a unique identification 1000 to the customized movie data. The customized movie data may then undergo a dynamic rendering process 1100 (See also FIG. 5) which may create the video based on the unique film data using assets from blocks 500, 600, and 700 described above. The processing segment 102 may then dynamically render 1300 the final customized movie integrating the assets into the dynamic rendering of the customized movie data.

Referring to FIG. 3, the process 800 is shown with additional detail which may include a plurality of features which may be used in a variety of orders to create a customized film. The process 800 may include a film identification 1001 for the main or default movie. A unique identification 1000 may be created an attached to the customized movie. Some embodiments may use temporary film data 901, which maybe based on the film's date in creating a customized movie. A scene selection process 810 may include selecting between default scenes and alternative scenes. In some embodiments, the alternative scenes and dynamic content may include a classification based on weighting factors which may be used to determine when to switch a default scene out for an alternative scene or dynamic content. In some embodiments, the alternative scene or dynamic content may be inserted in between default scenes instead of switching scenes out entirely. The weighting factors may be based on for example, the viewer data, the film data 300, and the additional data 400. The process 800 may include a step of filmmaker adjustments 815, which may include modifying the scene selection process and weighting used by different filmmakers based on film analytics and machine learning data. Some embodiments may include analyzing scene selection processes using 825 artificial intelligence. Some embodiments may include a step 850 of using adaptive mutation which may temporarily alter film data according to film analytics and machine learning which analyzes the experience of current and similar viewers of the movie. Some embodiments may include a step of randomization 875 which may include temporarily updating the scene selection process by randomizing content which is used as default scenes. The process 800 may terminate by finalizing the scene selections into a customized unique film data 900.

Referring back solely to FIG. 1, the output segment 103 may include entry 1400 of the film's unique ID into a public ledger chain. The rendered result of block 1300 may be played back via video, virtual reality, augmented reality, or any other digital video playback means in final output form 1500. In some embodiments, the final output form 1500 (and its underlying creation data) may be analyzed using machine learning so that filmmakers may make adjustments based on the user experience to enhance and improve on future experiences.

Figure 4:
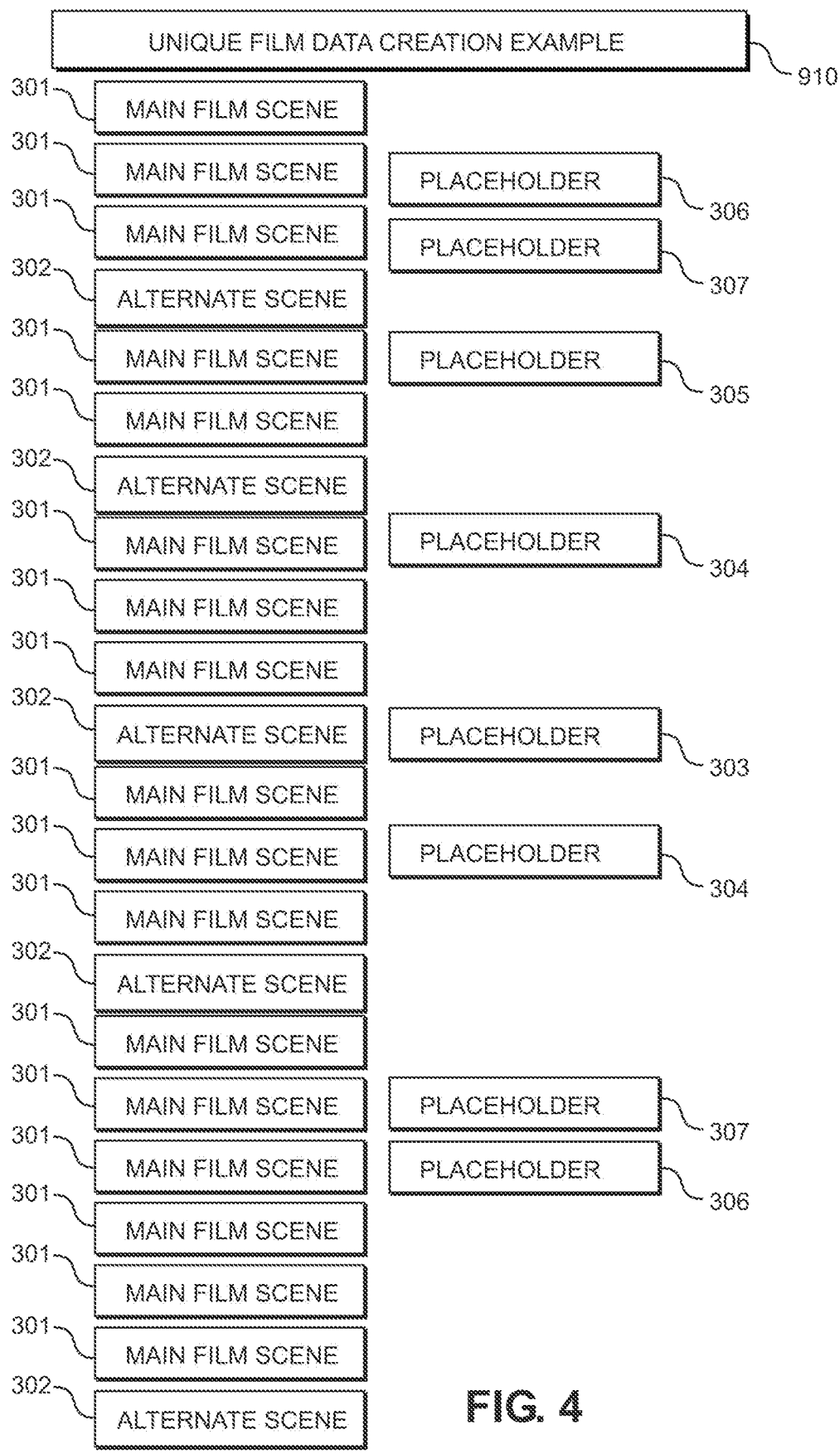
FIG. 4 is a diagrammatic view of a film sequence timeline showing positions where placeholder scenes may replace main film scenes tailored to a viewer according to an exemplary embodiment.

FIG. 4 shows an example of a unique film scene data sequence map 910 according to an exemplary embodiment. Block 910 includes a sequence of default scenes 301. The blocks 301 labeled as "MAIN FILM SCENES" may represent default scenes of a default screen play that will be shown in order if no modifications to the movie were made to customize the movie experience to the user. In some pre-determined places, an alternate scene 302 may be used instead of a default scene 301. The alternate scene 302 may be inserted automatically based on the data from the input segment 101. Some embodiments may have placeholder scenes 304, 305, 306, and 307 which may be used/inserted into the film at various points (which may be pre-determined points or may be dynamically selected according to a sub-process (for example, AI block 825 and/or adaptive mutation block 850, and/or randomization block 875). The end result would be the unique film data 900 (FIGS. 1 and 3).

Figure 5:
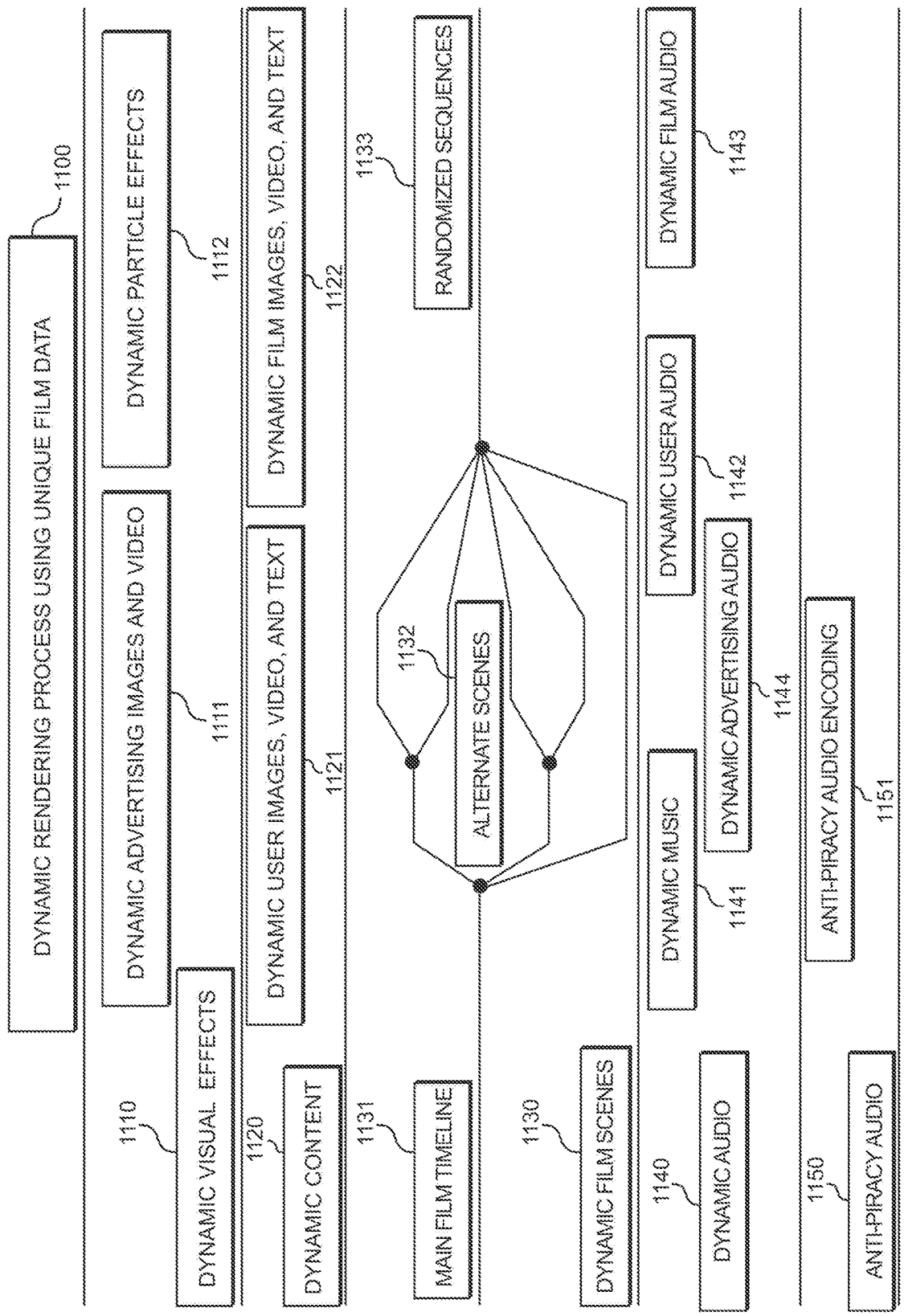
FIG. 5 is a diagrammatic view of a dynamic rendering process using unique film data according to an exemplary embodiment.
Figure 6:
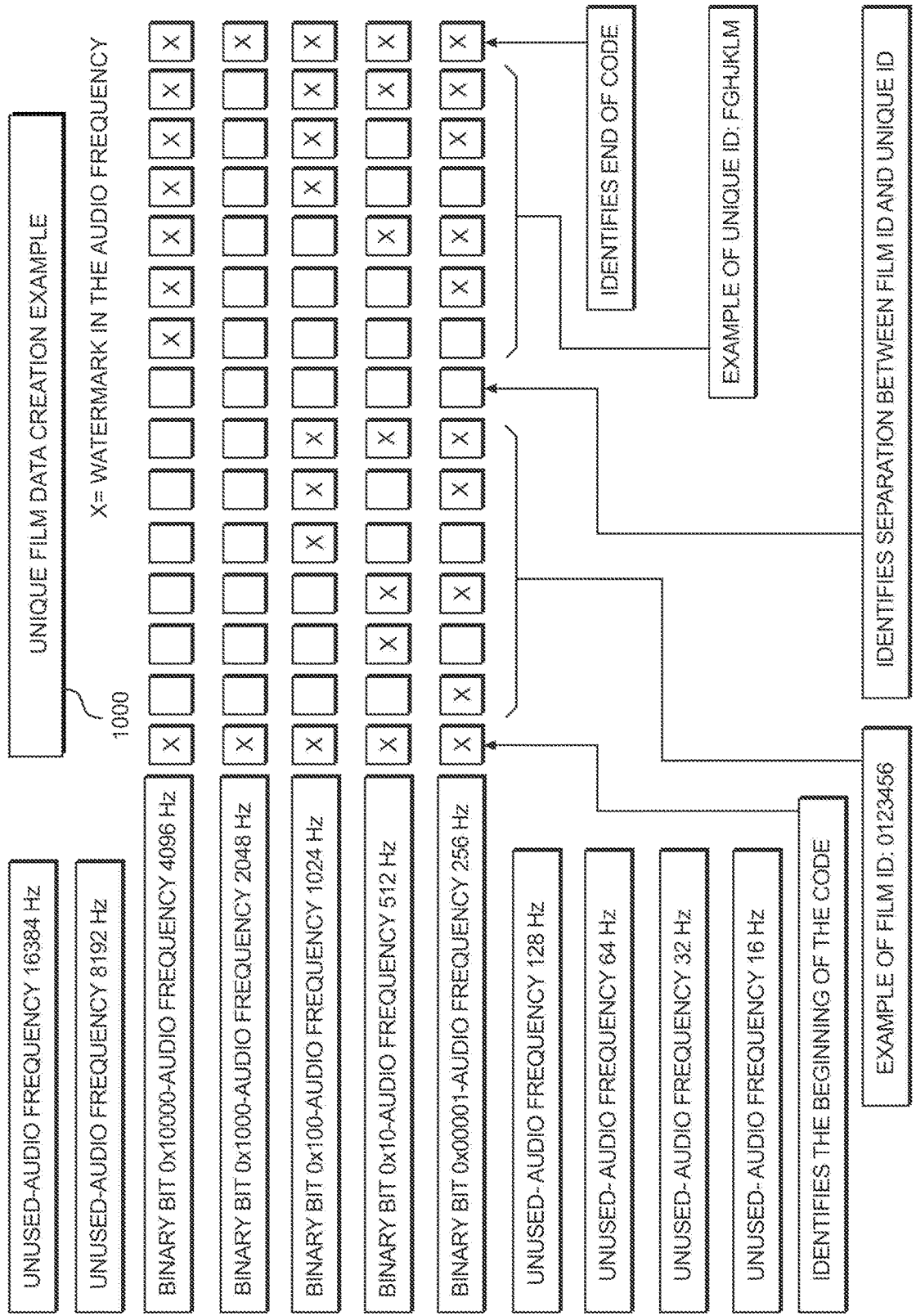
FIG. 6 is a diagrammatic view of an antipiracy encoding scheme according to an exemplary embodiment.

FIG. 5 shows additional detail of the dynamic rendering process 1100 according to an exemplary embodiment. The process 1100 is shown by depicting elements in the system which may contribute to (be added to) the customized movie. The contents of the unique film data being assembled is represented by dynamic rendering process 1100 which creates a unique film based on the sections detailed. Each section depicts a layer of the rendering process which is comprised of dynamic visual effects 1110, dynamic content 1120, dynamic film scenes 1130, dynamic audio 1140, and anti-piracy audio 1150.

The dynamic visual effects 1110 section contains all dynamic advertising images and video 1111 and dynamic particle effects 1112. This layer is pre-rendered before the other content. Examples and further details of this content is previously described. The contents of this section have been determined and defined in the unique film data.

The dynamic content 1120 section contains dynamic user images, video, and text 1121 along with dynamic film images, video, and text 1122. Both are described previously in further detail. The contents of this section have been determined and defined in the unique film data.

The dynamic film scenes 1130 is comprised of the main film timeline 1131, alternate scenes 1132, and randomized sequences 1133. These are described previously in further detail. The contents of this section have been determined and defined in the unique film data.

The dynamic audio 1140 section is comprised of dynamic music 1141, dynamic user audio 1142, dynamic film audio 1143, and dynamic advertising audio. Each are described previously in detail. The contents of this section have been determined and defined in the unique film data.

The anti-piracy audio 1150 section is comprised of the anti-piracy audio encoding 1151. This is applied to the final audio mix.

A movie stream being played (or being constructed ahead of actual playback) may be influenced by a number of dynamic audio/video elements and alternate scenes 1132 which may also affect (modify) the timeline 1131. A plurality of elements may be accessed at any time during assembly of the scene sequences. The elements may include for example, dynamic visual effects 1110, dynamic advertising 1111, dynamic particle effects 1112, dynamic content 1120, dynamic user images, video, and text 1121, dynamic film images, video, and text 1122, dynamic film scenes 1130, dynamic audio 1140, dynamic music 1141, dynamic user audio 1142, dynamic film audio 1143, dynamic advertising audio 1144, anti-piracy audio 1150, and anti-piracy audio encoding 1151. While the above-described elements are shown relative to the timeline 1131, it will be understood that any data used from their respective files may be integrated into the film sequences at any time during assembly.

As shown, the customized movie (sequence of scenes) may be modified at one or more points along the main film timeline 1131. At some points, there may be decision points (for example, represented by the bold dots on the timeline 1131). The process may select an alternative scene 1132 at a decision point based on the user profile and the various other sources of data (described for example with respect to input block 101). As can be seen, the inclusion of an alternate scene 1132 may trigger multiple permutations in the sequence of scenes which may trigger additional alternate scenes 1132 to be included in the main sequence until the sequence of scenes returns to the main timeline of scenes 1131. In some embodiments, the timeline 1131 may also be modified by the implementation of randomized sequences 1133. As will be appreciated, these aspects generate any number of permutations to the storyline which can provide entirely different movie experiences for each individual viewer user.

The subprocesses of block 800 may be used to generate a blueprint of the film in block 900. In some embodiments, a unique ID may be generated in block 1000 which may be used in an antipiracy aspect discussed in more detail below. In block 1100, the output from block 900 along with data from input blocks 500, 600, and 700 may be used render the video stream, the finished product of which may be rendered in block 1300.

Referring now to FIGS. 6-8, antipiracy measures are disclosed according to exemplary embodiments. Anti-piracy may be performed in three main steps.

1) Encoding and Public Ledger): The unique ID 1000 of FIG. 1 may be used in an anti-piracy encoding process shown in FIG. 6 according to an exemplary embodiment that may be used to track media content. In an exemplary embodiment, a binary bit stream may be attached to the media stream. The binary bit stream may be included for example, within an audio track of the media stream. One or more audio frequencies of the film may be tagged with a watermark. The unique ID codes may be stored in a table which may associate the codes to a unique film stream. The table may be referenced in the public ledger 1400 when a blockchain system is used to track the film. When a movie is pirated, the unique code imprinted in the audio frequencies is traced back to the pubic ledger to identify the user responsible for the piracy.

FIG. 7 shows examples of a table 1001 of film identification and unique film identification codes 1002. In the example, we identify 5 binary bit values to fit in the above 5 audio frequencies. Each alphanumeric value is represented in the identification of the unique ID used for tracking. The binary combination of all 5 bits on represents the beginning and ending of encoding. The binary combination of all bits off represents no encoding. All binary combinations between represent a tracking system used for identification.

FIG. 8 shows the tracking system 1410 where each film created for a user is recorded in a private system 1401. This private tracking system details the film itself, the creation details, and details on when it was viewed. The tracking codes used in film identification 1002 correspond with the film ID and unique ID seen in the tracking system. When a film is created and recorded in the private data 1401, it is also added to the public data in the form of a blockchain 1400 providing both the creation date and tracking codes. When a film is pirated, the combination of this information is used to identify the person responsible.

2) Personalization: As may be appreciated, the customization of films may provide a deterrent since one is unlikely to want to pirate another person's film rather than having their own experience. The personalization of the film creates a unique viewing experience specific for the intended viewer. The unique film data may be identifiable and traced using for example, the watermarked binary bit stream(s).

3) Intrigue: A new level of interest is created by viewers knowing that a movie is not only personalized but is different each time it is watched. If a person does pirate or watch another user's film, that person will be intrigued to create his or her own. To do so, they will need to access an authorized copy.

Aspects of the subject technology described may take the form of a computer program product (sometimes referred to as a software application) embodied in computer readable media having computer readable program code embodied thereon. A computer readable storage medium may be any tangible or non-transitory medium that can contain, or store a program for example, a program product for use by or in connection with an instruction execution system, apparatus, or device stored in the remote device. A computer readable storage medium may be, for example, but not limited to, an electronic, magnetic, optical, electromagnetic, infrared, or semiconductor system, apparatus, or device, or any suitable combination of the foregoing. The system memory may include at least one program product having a set (e.g., at least one) of program modules that are configured to carry out the functions of embodiments of the invention. The program product/utility, having a set (at least one) of program modules, may be stored in the system memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of embodiments of the invention as described herein.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the present invention is reflected by the breadth of the claims below rather than narrowed by the embodiments described above.

What is claimed is:

1. A process for generating customized movies tailored to a viewer user, comprising:

receiving a video stream of a default movie comprising a sequence of default main film movie scenes shown in a default order of a storyline;

receiving an input of a user profile from the viewer user, wherein the user profile includes user provided information and user online activity;

extracting personal audio, video, and text content from the user profile;

modifying the default movie by adding dynamic user content into the main film movie scenes of the storyline, wherein the dynamic user content includes one or more of the extracted personal audio, video, and text content synthesized into the main film movie scenes of the storyline;

generating different scenes in subsequent viewings of the storyline based on random selection of the dynamic user content inserted into the storyline; and rendering the customized digital sequence of movie scenes into a dynamic streaming movie tailored to the user based on the user profile.

2. The process of claim 1, further comprising:

assembling a plurality of decision making points;

storing a plurality of alternate scenes for each decision making point; and selecting one of the plurality of alternate scenes at one or more of the decision making points, wherein the selection is based on the user profile.

3. The process of claim 1, wherein:

the dynamic streaming movie is rendered with alternate scenes inserted into the sequence of default main film movie scenes, and the alternate scenes modify the default order of the storyline associated with the sequence of default main film movie scenes.

4. The process of claim 1, wherein:

the user online activity is extracted from social media activity of the viewer user.

5. The process of claim 1, further comprising attaching a watermark to an audio track to be played with the customized digital sequence of movie scenes.

\* \* \* \* \*